May 16, 1967 F. A. SEELIG 3,319,951
FLEXURAL PIVOT DEVICE AND METHOD OF MAKING SAME
Filed March 15, 1965
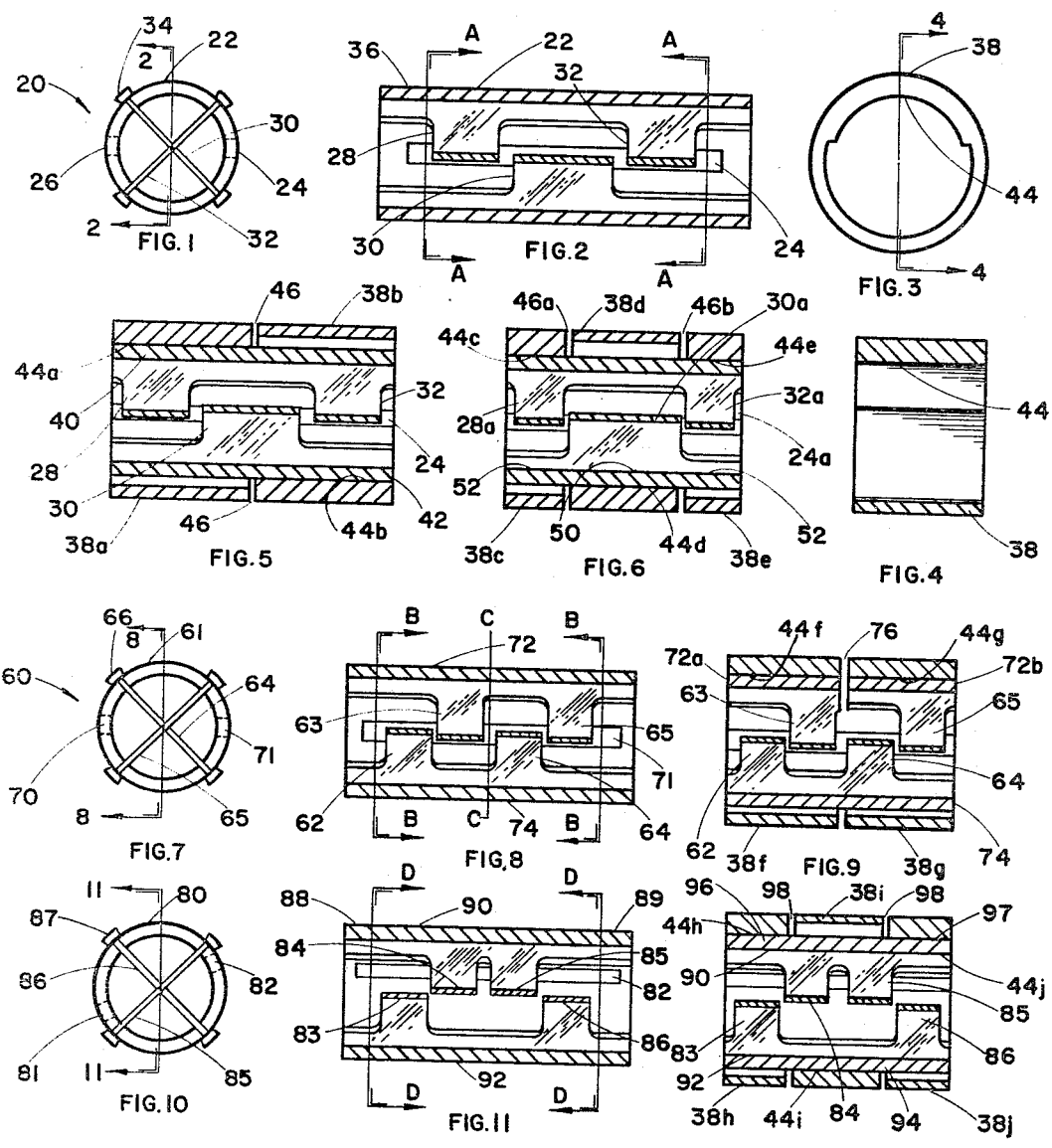
FREDERICK A. SEELIG
*INVENTOR.*
BY 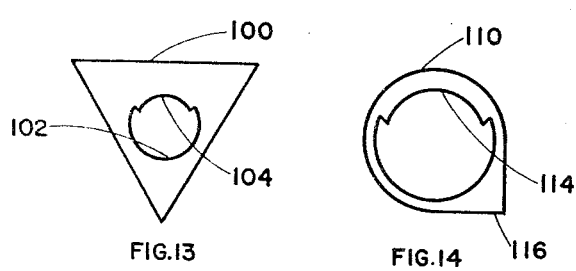

United States Patent Office 3,319,951
Patented May 16, 1967

---

3,319,951
FLEXURAL PIVOT DEVICE AND METHOD OF MAKING SAME
Frederick A. Seelig, New Hartford, N.Y., assignor to The Bendix Corporation, Utica, N.Y., a corporation of Delaware
Filed Mar. 15, 1965, Ser. No. 439,621
5 Claims. (Cl. 267—1)

This invention relates to friction-free devices for permitting angular deflections in mounted or supported structures and more particularly relates to a novel flexural pivot structure and to an improved method of manufacture of flexural pivots.

Objects of this invention are to simplify the method of manufacture of flexural pivots, to make flexural pivots of different designs with interchangeable parts, to reduce the amount of scrap material produced in the manufacture of flexural pivots, to reduce the cost of manufacture of flexural pivots and to improve the performance characteristics of flexural pivots.

Previously-known methods of manufacturing flexural pivots comprised the steps of forming a tubular core, bonding the core structure, grinding or undercutting a portion of the core, bonding a one-piece outer sleeve or support structure to the core, cutting the transverse ends of the core and support structure, severing the outer sleeve into two pieces, and in some flexural pivot structures, severing a part of the core. These steps are well known and are described in U.S. Patents 3,124,873 and 3,142,888, issued to Henry Troeger. In additional to the above-described basic steps, various finishing operations were necessary to make the article more commercially acceptable.

The present invention eliminates the steps of grinding or undercutting the core, cutting the ends of both core and support structure and cutting the support structure alone. In addition, the finishing steps of grinding the ends of both core and support structure and of cleaning the gap produced by severing the support structure are eliminated. The elimination of the above steps is achieved by the use of preformed support structure members.

The previously-known methods of making flexural pivot devices frequently produced in relatively-thin spring flexural pivot devices a warped spring structure which altered the orientation of the core within the outer sleeves so that the desired angular displacements could not be achieved. This result is believed to be caused by the uneven cooling of the uncut core assembly following the bonding of the springs to the core. The present invention solves that problem by cutting the cores prior to permanent bonding.

Prior art devices, those disclosed in U.S. Patent 3,073,-584 issued to Henry Troeger, were found, when subject to radial loads, to be less rigid than desirable. In such devices, the core structure's axial bending would not be smoothly distributed over the entire axial length of the core. Such uneven axial bending concentrated the radial load disproportionately on small sections of the interconnecting spring structure, often causing buckling of a part of the spring structure, thereby damaging or destroying the device. The uneven axial bending of the core structure and the resultant uneven distribution of stress on the springs is due to the discontinuity in the core thickness. The present invention, by causing the more even sharing of radial loads by spring members, reduces the risk of spring damage and raises the radial load capacity of a flexural pivot of fixed physical dimensions. Prior art flexural pivots, to achieve the same radial load capacity, required stiffer or thicker spring members, thereby sacrificing pivot flexibility.

FIGURE 1 is an end view of a slotted tubular assembly having crossed flat springs.

FIGURE 2 is a sectional view of the tubular assembly shown in FIGURE 1, taken along the line 2—2 and showing a slot and the crossed flat springs.

FIGURE 3 is an end view of an outer sleeve or support member being an embodiment of part of the invention.

FIGURE 4 is a sectional view of the support member shown in FIGURE 3 taken along the line 4—4.

FIGURE 5 is an axial view in section of a first embodiment of the invention made according to the process to be described made from the articles shown in FIGURES 1 and 2, and 3 and 4.

FIGURE 6 is an axial view of a second embodiment of the invention made according to the process to be described made from the articles shown in FIGURES 1 and 2, and 3 and 4.

FIGURE 7 is an end view of a core assembly showing slots and crossed flat springs.

FIGURE 8 is an axial view of a section of the core shown in FIGURE 7 taken along the line 8—8.

FIGURE 9 is an axial view of a section of a third embodiment of the present invention made according to the process to be described from the articles shown in FIGURES 3 and 4, and 7 and 8.

FIGURE 10 is an end view of a core assembly showing slots and crossed flat springs.

FIGURE 11 is an axial view in section of the core shown in FIGURE 10 taken along the line 11—11.

FIGURE 12 is an axial view in section of a fourth embodiment of the present invention made according to the process to be described from the articles shown in FIGURES 3 and 4, and 10 and 11.

FIGURE 13 is an end view of a first modification of outer sleeve or support member being an embodiment of part of the invention.

FIGURE 14 is an end view of another modification of outer sleeve or support member being an embodiment of part of the invention.

Referring to FIGURE 1, a tubular core indicated generally by the numeral 20 consists of tube 22 with axially-extending slots 24 and 26. Within the core are axially-spaced crossed flat spring members 28, 30 and 32. Prior to permanent bonding, the core 22 and the spring members 28, 30 and 32 may be held together by fixture elements 34 or by tack welding or by a coil spring (not shown). When the fixture elements 34 or coil spring are employed, the entire assembly is coated with a bonding material and then bonded as by brazing or welding. Both fixture devices may be coated with a "stop-off" agent to prevent adherence to the tubular core. In those flexural pivot devices where the crossed springs are relatively light, temporary bonding of springs to core is by tack welding to prevent damage to the springs from the uneven cooling of the uncut core assembly. After the springs are bonded to the tubular core, the transverse ends 36 of the tubular core are removed along a line intersecting both of the axially-extending slots 24 and 26 but outside of the spring members 28, 30 and 32 as shown by the dotted lines A—A in FIGURE 2. Removing the transverse ends of the tubular core forms two axially-extending rib or arcuate members 40 and 42 interconnected by axially-spaced crossed flat springs 28, 30 and 32 having a circumferential gap between the rib members, as shown in FIGURE 5. The arcuate members in the embodiment shown are arranged on a substantially-common circle and have a total arc length of less than 360°. In those flexural pivot devices where the crossed springs are relatively light, the removal of the transverse ends of the core follows the temporary bonding of core and springs. After removal of the core ends, the springs and core are coated and permanently bonded together.

A hollow metal outer sleeve or outer support member 38, FIGURES 3 and 4, is formed with an axially-extending, radially-inwardly-projecting connecting surface 44. The outer sleeve is formed into the desired shape by sintering. Prior art flexural pivots were often difficult to mount because of the cylindrical shape of the outer sleeve. Frequently, expensive mounting methods or structures have to be formed onto or attached to the flexural pivots to permit mounting. The irregular exterior shapes, illustrated in FIGURES 13 and 14, are illustrative of the many possible exterior shapes which the outer support members may take. FIGURE 13 illustrates a triangular or pyramid-shaped outer sleeve 100 having a circular inner surface 102 and an axially-extending, radially-inwardly-projecting connecting surface 104. FIGURE 14 illustrates an outer sleeve or outer support member 110 having a circular inner surface 112 and an axially-extending, radially-inwardly-projecting connecting surface 114. The external surface of the sleeve 110 is generally cylindrical but it has a "squared" portion 116. Widely-varying shapes such as those illustrated in FIGURES 13 and 14 are easily formed by sintering. In describing the novel process for forming the completed flexural pivot, only the outer sleeve embodiment illustrated in FIGURES 3 and 4 will be discussed. The outer sleeve embodiments, shown in FIGURES 13 and 14, are used in the identical manner and, therefore, are not specifically discussed.

In view of the similarity of parts illustrated, similar parts or structure will bear similar numbers followed by a letter suffix without further explanation. Thus, the outer sleeve members will always bear the numbers 38 and 44 followed by the appropriate suffix.

Referring now to FIGURES 3, 4 and 5, two outer sleeve or support members 38a and 38b are placed about the core and an axial gap 46 is maintained between the outer sleeve members 38a and 38b. The sleeves are then aligned so that connecting surface 44a is in contact with rib member 40 and no other member and connecting surface 44b is in contact with rib member 42 and no other member. The aligned sleeves are then bonded as by welding or brazing them to their respective rib members to form a completely-assembled flexural pivot device.

A tubular core, identical to the one shown in FIGURE 2 and subject to the same process as previously described, through to removing the transverse along lines intersecting the axially-extending slots, can be readily formed into the completed double-end pivot shown in FIGURE 6.

In the old process, the core has to be ground or undercut in three places to form a double-ended pivot. By the new process, three outer support members 38c, 38d, and 38e are disposed about the core. One, 38d, has its connecting surface 44d aligned with the center section 50 of the rib or arcuate member 42a and no other member. The other two outer sleeves, 38c and 38e, mounting surfaces 44c and 44e are aligned with the rib or arcuate member 40a at the transverse ends 52 of the core. Axial gaps 46a and 46b are maintained between the sleeve members. The aligned sleeves are then bonded to their respective rib members as aligned. In this manner, the transverse ends may be mounted in one member and the center section mounted to another member with relative angular displacement permissible therebetween. The outer supports 38c, 38d and 38e may be either formed to the appropriate length or cut to the correct length from the sintered metal.

In FIGURE 7 is shown a slotted tubular core indicated generally by the numeral 60 having a tube 61 interconnected by crossed flat springs 62, 63, 64, and 65, held together by fixture members 66. After the steps of bonding the tube and springs 62, 63, 64 and 65 together and removing the transverse ends of the tube 68 at the line B—B intersecting the slots 70 and 71, two axially-extending ribs or arcuate members 72 and 74 are formed. A radial cut 76 is made through rib 72 at line C—C intermediate the crossed springs (and through any part of spring structure existing from the assembly of the tubular core). The resulting core structure consists of a rib or arcuate member 72 having two axially-extending members or rib sections 72a and 72b linked by the flat crossed axially-spaced springs 62, 63, 64 and 65 to rib or arcuate member 74 and to each other as shown in FIGURE 9. Two outer sleeve members, 38f and 38g, are disposed about the rib sections and rib member. The connecting surfaces 44f and 44g are aligned with member 72a and member 72b respectively and bonded as aligned to form the flexural pivot device shown in FIGURE 9. An axial space 76 is maintained between the outer sleeve members. Such a device is capable of greater angular displacement between the outer support member than those illustrated by FIGURES 5 and 6 because the shift in pivot axis or center is decreased by the displaceable rib sections 72a and 72b.

FIGURES 10–12 illustrate another type of flexural pivot device of an embodiment of the present invention made according to the present invention. A tubular core 80, having axial openings or slots 81 and 82, has internally-crossed flat springs 83, 84, 85 and 86 and is held together by fixture element 87. After bonding or otherwise fastening the springs 83, 84, 85 and 86 to the core 80, the transverse ends 88 and 89 of the core are removed along lines intersecting the slots 81 and 82 as shown by the lines D—D on FIGURE 11, forming axially-extending ribs or arcuate members 90 and 92. Outer support or outer sleeve members 38h, 38i, and 38j are disposed about the rib members 90 and 92. The connecting surface 44i is aligned with the center section 94 of rib 92. The connecting surfaces 44h and 44j are aligned with 96 and 97 of rib 90. The connecting surfaces are bonded to the respective ribs as aligned to form a four-spring double-end flexural pivot device.

The four types of flexural pivot devices shown and described are only illustrations of the kinds of flexural pivots which can be made employing the novel structure and method described herein. Other variations of structure and arrangement of parts and order of processes are apparent to those skilled in the art and are within the scope and spirit of the invention.

The method herein described eliminates the prior art steps of grinding or undercutting the cores to provide both mounting surfaces and space for angular displacement, of removing the ends of both core and outer support, thereby saving material and effort, and of cutting the outer support member circumferentially. Various finish operations necessitated by the now-eliminated steps such as grinding and cleaning of core and support members are also eliminated. It is now easier to make double-ended flexural pivots because of the elimination of two cuts in the outer support members. Matching of cores and sleeves is also easier because of the shortened sleeve length and the multiple number of sleeves used. For this reason, tolerances are less critical.

The flexural pivots using sintered metal sleeves have more readily variable external shapes and are lighter in weight yet provide greater effective radial rigidity.

I claim:
1. A flexural pivot device comprising:
   a tubular core means having two axially-extending arcuate members of uniform thickness throughout;
   flat longitudinally-spaced crossed spring means interconnecting said axially-extending arcuate members on a substantially common circle, said spring means having a diameter substantially equal to the diameter of said tubular core;
   said axially-extending arcuate members having a total arc length less than 360°, thereby providing a circumferential gap between said axially-extending arcuate members;
   a plurality of cylindrical outer sleeve means having an axially-extending, radially-inwardly-projecting inner surface over a portion of said outer sleeve circumference; and said radially-inwardly-extending inner circumferential surfaces connected to said axially-extending arcuate members so to permit relative angular displacement therebetween.

2. A flexural pivot device comprising:

a first axially-extending arcuate means of uniform thickness throughout;

a second axially-extending arcuate means of uniform thickness throughout;

a plurality of axially-spaced crossed flat spring means interconnecting said first and second axially-extending means substantially on a common circle;

a first outer sleeve means having a circular inner surface with a radially-inwardly-projecting connecting surface formed thereon;

a second outer sleeve means having a circular inner surface with a radially-inwardly-projecting connecting surface formed thereon; and said first and second outer sleeve means disposed about said first and second arcuate means and connected at said connecting surfaces to a portion of one of said arcuate surfaces for relative angular displacement therebetween.

3. The device described in claim 2 wherein:

said first outer sleeve means having a cylindrical outer surface is fastened at said connecting surface to said first arcuate means;

said second outer sleeve having a cylindrical outer surface is fastened at said connecting surface to said second arcuate means; and an axially-extending gap between said first and second outer sleeve means.

4. The device described in claim 2 wherein:

said first outer sleeve means consists of first and second members each having said connecting surfaces;

said second outer sleeve means is connected at said connecting surface to said first arcuate means section;

said first and second members of said first outer sleeve means each connected at said connecting surface to said second arcuate members;

said first and second arcuate members forming a tubular core having a center section and transverse ends;

said second outer sleeve means disposed about said center section; and said first outer sleeve means being disposed about said transverse ends.

5. The device described in claim 2 wherein:

said first arcuate means having first and second axially-extending members with an axial gap therebetween;

said first outer sleeve means fastened at said connecting surface to said first member of said first arcuate means;

said second outer sleeve means connected at said connecting surfaces to said second member of said first arcuate means; and said first and second outer sleeve means able to be angularly displaced relative to one another.

References Cited by the Examiner

UNITED STATES PATENTS 3,073,584  1/1963  Troeger.

EUGENE G. BOTZ, *Primary Examiner.*

ARTHUR L. LA POINT, *Examiner.*

R. W. WOHLFARTH, *Assistant Examiner.*